J. N. LANGUM.
HORSE COLLAR AND HAMES.
APPLICATION FILED SEPT. 13, 1910.
1,020,042.
Patented Mar. 12, 1912.
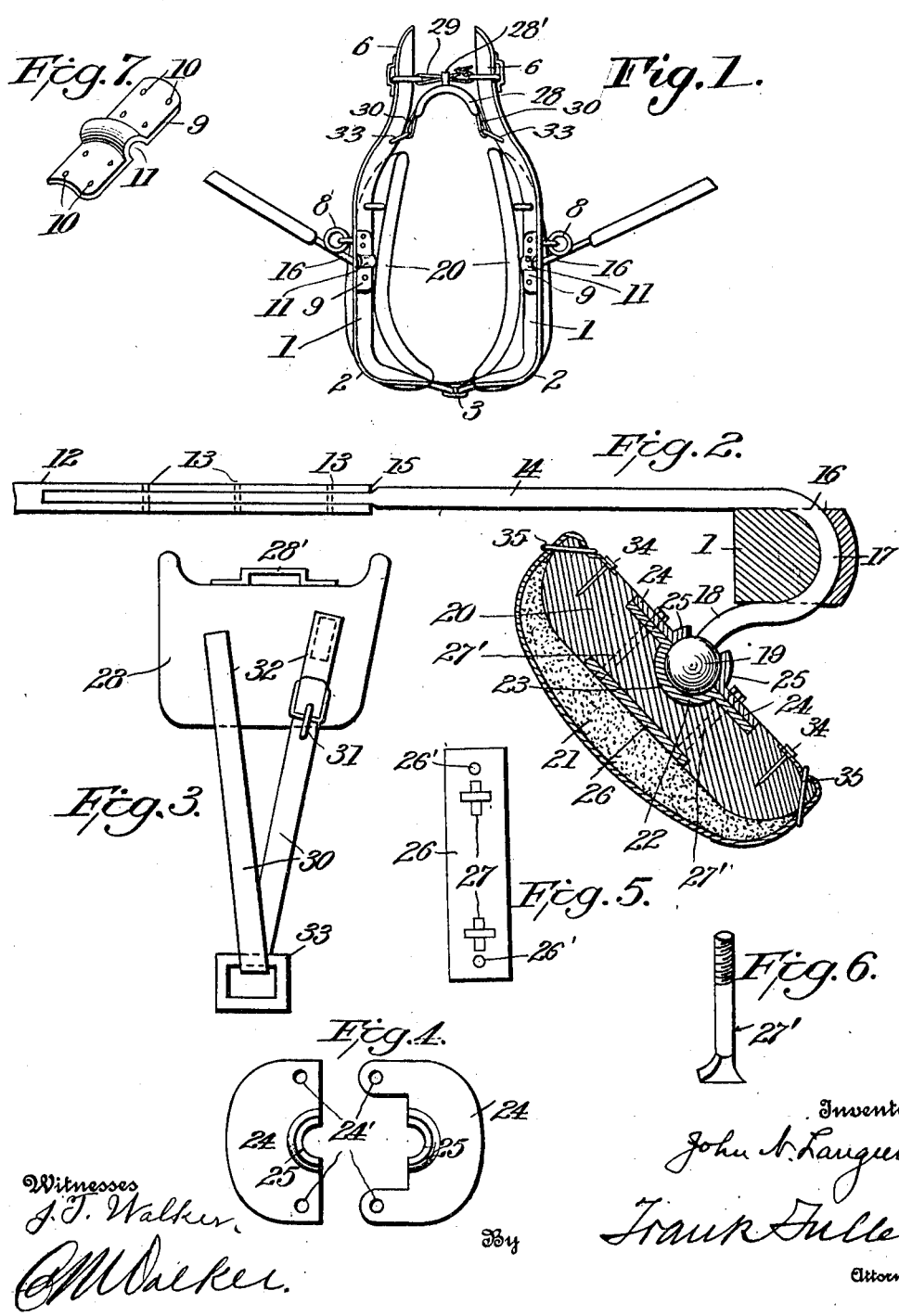

UNITED STATES PATENT OFFICE.

JOHN N. LANGUM, OF BARTON, NORTH DAKOTA.

HORSE-COLLAR AND HAMES.

1,020,042.  Specification of Letters Patent.  Patented Mar. 12, 1912.

Application filed September 13, 1910. Serial No. 581,888.

*To all whom it may concern:*

Be it known that I, JOHN N. LANGUM, a citizen of the United States, residing at Barton, in the county of Pierce and State of North Dakota, have invented certain new and useful Improvements in Horse-Collars and Hames, of which the following is a specification.

My invention relates to new and useful improvements in combined horse collars and hames.

The objects of my invention are to provide a combined horse collar and hames, which are adjustable and easily fitted to the neck, and which will bear evenly upon all parts and not upon particular points of the shoulder of the horse while in action, as is now done by the old style collar and hames.

Further objects are to provide a horse collar having a socket adaptable to a voluble ball on a curved trace rod, and upon which the draft falls when in use, and so constructed that the collar may swing and move in conformity with the action of the horse's shoulder, thus securing a humane as well as a durable and efficient adjustable collar capable of being fitted to the neck of any horse.

Further objects are to provide a horse collar and hames which remove the pressure or draft almost entirely from the hames, thereby preventing uneven friction produced by the ordinary collars and hames now in use.

I accomplish these objects by the device illustrated in the accompanying drawings, in which, Figure 1, is an elevation of the collar in adjustment with the hames. Fig. 2, is a plan view of the device with a section view of the collar showing the ball and socket in position for use. Fig. 3, is a detail view of the saddle and strap and buckle attachments. Fig. 4, is a detail view of the plates to hold the balls in the sockets. Fig. 5, is a detail of the plates to strengthen the collar and secure the sockets in the collar. Fig. 6 is a detail of the rectangularly headed bolt. Fig. 7, is a detail of the rod plates for securing the rods to the hames.

Similar figures refer to similar parts in the several views.

Referring specifically to the drawings, the hames, 1—1, are formed with curves at their bases or lower portions, 2, where they are provided with the ordinary straps and buckles, as at 3. The upper portions of these hames are formed with abrupt angles, 4, curved portions or elbows, 5—5, and ends, 6—6, which are attached to each other by the usual straps and buckles, as at 7. Line or strap rings are suitably secured to the sides of the hames, as at 8.

The adjustable plates 9, are provided with apertures, as at 10, through which screws are inserted, securing the same to the fronts or faces of the hames. These apertures are so constructed as to permit the plates to be raised or lowered along the hames so that they may be fitted to any sized horse's neck, and bring the trace rod in proper relation thereto. The plates 9 are provided with central concave portions, as at 11, into which the trace rods are inserted and loosely secured to the hames, as hereinafter described.

A trace or tug, 12, is suitably secured by rivets, as at 13, to the trace rod.

The trace rod, 14, has a straight portion flattened at one end, 15, for the purpose of securing the same to the trace or tug, as at 13, the opposite end being bent upon itself forming an abrupt curve, 16, substantially a U shape, and adapted to adjustment around the hame, and extending through the concave portion, 11, of the plate 9, as at 17, where it is held loosely in position against the hame, thus preventing the rod from slipping up or down, allowing it however, to turn as it is moved by the action of the trace or tug 12. The end of this trace rod 14, is formed with an outward bend, 18, and on its extremity is provided a ball, 19, adapted to and revoluble in a socket in the collar, as hereinafter described.

20 is a collar section, comprising the usual wooden or other back with an outer leather front and an interposed cushion filling, as at 21. This collar section is of suitable length and dimensions to be conveniently adjusted to the hame, and on the face thereof is provided a depression or socket bed 23, while 22 is a plate having a socket centrally therein, adapted to the socket bed 23, and is thus formed for the purpose of loosely engaging the ball 19 on the end of the trace rod 14, in which it is inserted in the operation of the device.

24 is a plate having upturned, concave lips, as at 25, and adapted to loosely retain the ball 19 in revoluble position in the socket in plate 22. This plate is secured to the collar section through suitable screw openings, 25', and holds the ball 19 in position, causing the collar section and hame to swing and move in conformity with the action and position of the neck and shoulders of the horse, as the draft falls directly upon the balls in their bearing in the collar, thus relieving the hames of all draft.

The plate 26 has openings therein, as at 26', through which screws may be inserted to secure the same to the wooden portion of the collar, directly opposite the socket beds 23. It is also provided with transverse slots at each end, as at 27, and cross depressions of equal dimensions, and adapted to receive rectangularly headed bolts, in assembling the parts, as hereinafter set forth. The bolts 27' are provided with rectangular heads adapted to the slots 27 in the plate 26, thereby securing the plates to the collar through suitable openings therein. These bolts extend beyond the collar and press through suitable openings in the socket plates, 22 and 24, and project sufficiently above the plates to accommodate ordinary nuts, thus holding the plates securely in position. This arrangement of the plate 26, and the bolts passing therethrough and through the socket plates 22 and 24, gives stability and strength to the same at the point where the ball 19 presses and where the draft falls the heaviest in the use of the device.

The neck pad 28 has a keeper centrally formed on the upper portion thereof, as at 28', through which the hames strap, as at 29, may pass. This neck pad is provided with suitable straps, as at 30, and buckle, as at 31, conveniently secured to the upper portion of the pad, as at 32. These straps are designed to pass through the staples 33, provided on the interior portion of the hames and thus support the same and prevent the collar sections from slipping or sliding down. This keeps the upper portion of the horse's neck free from contact with the collar sections, thus preventing the constant rubbing and heat produced by the ordinary collar and hames.

34 and 35 are ordinary screws and clasps to hold the collar parts rigidly together. This novel construction of the trace rods and ball and socket connections, forces the draft directly upon the collar, relieving the pressure on the hames, and as the balls revolve in the sockets the collar sections are forced to swing and move in accordance with the movement of the horse's shoulders, thereby maintaining an even pressure upon all points and preventing the strain and constant pressure upon any given point as now obtains with the ordinary and usual collars.

Having described my invention, what I claim and desire to secure by Letters Patent is as follows:—

1. A combined horse collar and hames, consisting of hames; sectional collars provided with sockets; curved trace rods, each having a ball on the end thereof revolubly mounted in one of the sockets; plates retaining said balls in said sockets; and means for fastening the said rods around the hames in adjusted position, substantially as described.

2. A combined horse collar and hames, consisting of hames; sectional collars having sockets mounted thereon; stay plates; means for securing said stay plates to the collar sections; curved trace rods, each having a ball on the end thereof revolubly mounted in the said sockets; means for fastening the said rods around the hames in adjusted position; a collar pad; and means for securing said pad to the hames, substantially as described and set forth.

In testimony whereof I affix my signature in presence of two witnesses.

JOHN N. LANGUM.

Witnesses:
R. A. NORDBYE,
W. A. KERN.